3,395,191
PRODUCTION OF t-BUTYL-m-XYLENE
Harry E. Cier, Baytown, Tex., assignor to Esso Research
and Engineering Company
Filed May 23, 1966, Ser. No. 552,037
7 Claims. (Cl. 260—671)

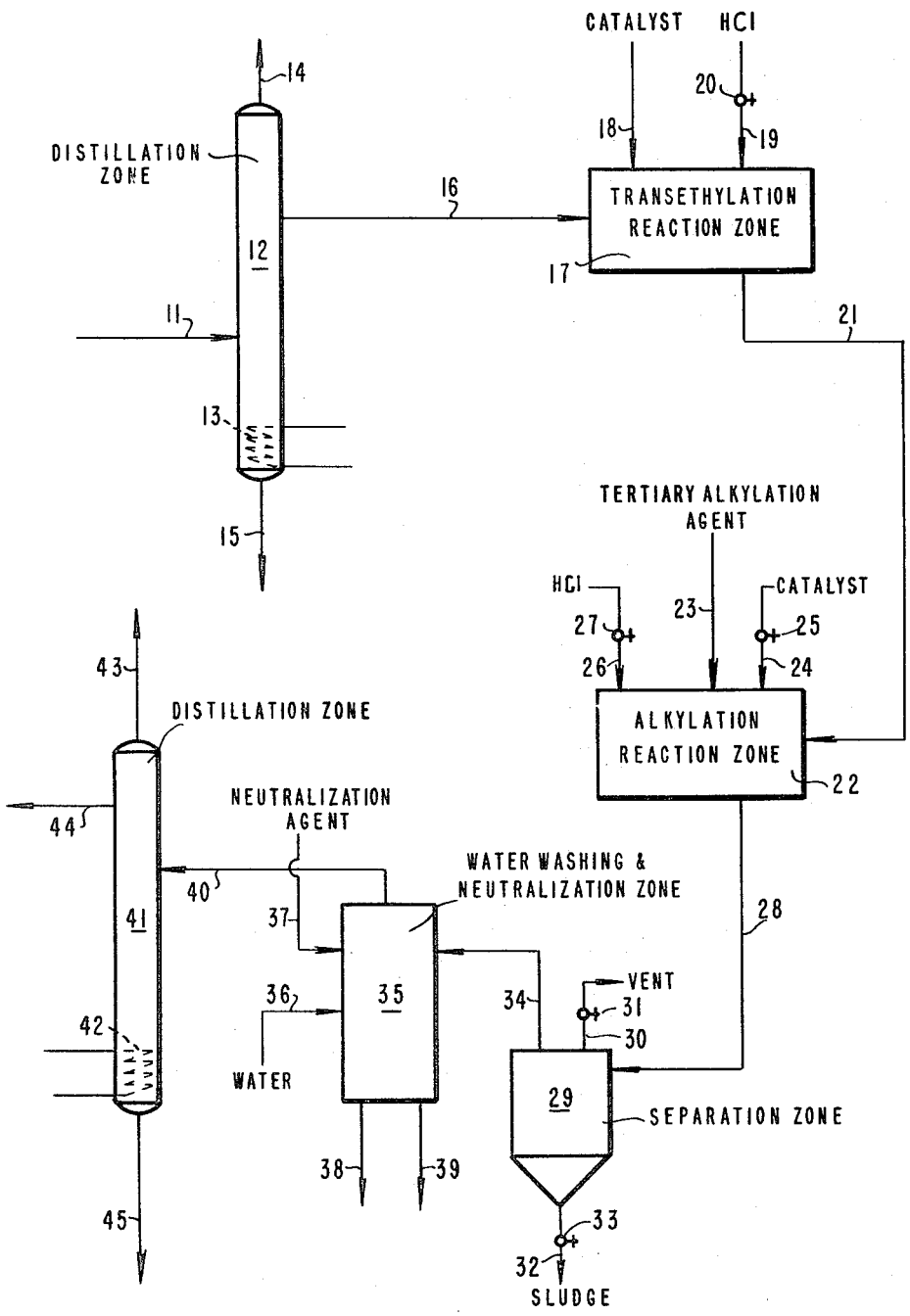

ABSTRACT OF THE DISCLOSURE

T-butyl-m-xylene is produced from a m-xylene concentrate containing o-xylene and ethylbenzene, without purification by superfractionation, by subjecting the m-xylene concentrate to transethylation conditions to form a product containing m-xylene, transethylated material formed from the o-xylene and ethylbenzene, and substantially free of ethylbenzene, this product then being subjected to alkylation conditions in the presence of a catalyst and a t-butyl alkylation agent to form t-butyl-m-xylene, which is then recovered.

---

The present invention is directed to a method for producing t-butyl-m-xylene. More particularly, the invention is concerned with the production of t-butyl-m-xylene from m-xylene concentrates containing substantial amounts of ethylbenzene. In its more specific aspects, the invention is concerned with the production of t-butyl-m-xylene from $C_8$ aromatic hydrocarbon fractions wherein superfractionation is avoided.

The present invention may be briefly described as a method for producing t-butyl-m-xylene from a $C_8$ aromatic hydrocarbon fraction containing m-xylene and ethylbenzene involving the steps of subjecting a $C_8$ aromatic hydrocarbon fraction to transethylation conditions in the presence of a catalyst to form a product containing the m-xylene, the transethylated material, and substantially free of ethylbenzene. The product is subjected to alkylation conditions in the presence of a catalyst and a tertiary alkylation agent selected from the group consisting of isobutylene, diisobutylene, triisobutylene, t-butyl alcohol, and t-butyl chloride to form an alkylated product containing t-butyl-m-xylene. The t-butyl-m-xylene is recovered from the alkylated product by distillation or by combination of water washing, neutralization and distillation.

The catalyst employed in the transethylation and alkylation steps is suitably aluminum chloride and hydrogen chloride, but other Friedel Crafts type catalysts may be used, such as, but not limited to, hydrogen fluoride, boron trifluoride, and the like. It is contemplated that the same catalysts may be used in both steps although it is within the scope of this invention to use one catalyst in the transethylation step and a different catalyst in the alkylation step. When the same catalyst is used in both steps, the catalyst may be added to the transethylation reaction zone and transferred with the product to the alkylation reaction zone.

Temperatures employed in the transethylation step may range from about 20° to about 100° C. with a preferred range from about 50° to about 90° C.

Temperatures employed in the alkylation step may range from about 20° to about 100° C. with a preferred range from about 50° to about 90° C.

Pressures may be employed in both steps sufficient to maintain a liquid phase. For example, pressure in the range from about 0 to about 50 p.s.i.g. may be employed.

Pressures are particularly important where hydrogen halides, such as hydrogen chloride, are used. A sufficient pressure should be employed to maintain the hydrogen halide in solution.

The amount of catalyst employed, particularly when aluminum chloride and hydrogen chloride comprise the catalyst, should be sufficient to form a complex at least with the transethylated material.

The feed stock in accordance with the present invention may contain from about 0.5 to about 10 mole percent of ethylbenzene. Preferably, the feed stock contains 0.5 to about 5 mole percent ethylbenzene. These amounts of ethylbenzene are the amounts of ethylbenzene left in a m-xylene concentrate after distillation. Heretofore, in producing t-butyl-m-xylene, it was necessary to alkylate a m-xylene concentrate which contained less than about 0.05 mole percent of ethylbenzene and equivalent amounts of ortho-xylene. This heretofore has been accomplished by superfractionation wherein the m-xylene rich fraction is subjected to highly efficient distillation in a fractional distillation zone or in a plurality of distillation zones. In accordance with the present invention, the superfractionation of the m-xylene rich fraction is avoided by employing transethylation to remove the ethylbenzene. Thus, in the presence of a catalyst, it is believed that ethylbenzene rapidly disproportionates and reacts selectively with orthoxylene. The product is highly reactive and complexes preferentially with aluminum chloride and in this form isomerizes to 1,3-dimethyl-5-ethylbenzene. Thus, in a fraction containing ortho-, meta-, and para-xylene and ethylbenzene subjected to transethylation conditions, the products are benzene, a $C_8$ fraction comprising predominantly m-xylene and p-xylene, while the $C_{10}$ fraction is predominantly the 1,3-dimethyl-5-ethylbenzene. By virtue of this reaction, it is possible in the present invention to avoid the use of superfractionation and to prepare t-butyl-m-xylene from ethylbenzene containing fractions by combination of transethylation and alkylation. It is understood, of course, that the invention is not to be limited by any explanation postulating the reaction mechanism thereof.

The present invention will be further illustrated by reference to the drawing in which a m-xylene concentrate having a typical composition as set out in Table I is employed.

TABLE I.—M-XYLENE CONCENTRATE

| | Mole percent |
|---|---|
| o-Xylene | 0.5–10 |
| m-Xylene | 70–88 |
| p-Xylene | 9–13 |
| Ethylbenzene | 0.5–10 |

In the single figure of the drawing which illustrates a preferred mode and embodiment, numeral 11 designates a charge line wherein a hydrocarbon fraction is charged to a distillation zone 12 which may be a distillation zone provided with internal vapor-liquid contacting means and a heating means illustrated by steam coil 13 to separate a m-xylene rich concentrate containing other $C_8$ aromatic hydrocarbons. A substantial part of the ethylbenzene is removed from distillation zone 12 in line 14 while a substantial part of heavier material is discharged by line 15. A m-xylene rich concentrate is withdrawn by line 16 and introduced into a transethylation reaction zone 13 into which a catalyst such as aluminum chloride may be introduced by line 18 and a hydrogen halide may be introduced by line 19 controlled by valve 20. Conditions of temperature and residence time which may range from about 5 to about 60 minutes and pressures are maintained in zone 17 to cause substantially all of the ethylbenzene to be converted by a reaction mechanism which may involve disproportionation and selective reaction with orthoxylene to 1,3-dimethyl-5-ethylbenzene. This material will complex with the aluminum chloride and hydrogen chloride to form a liquid sludge which may be in solution in the aromatic hydrocarbon. The total material from zone 17 is withdrawn by line 21 into an alkylation reaction zone 22 into which there is introduced by line 23 a tertiary alkylation agent which may be isobutylene, diisobutylene, triisobutylene, tertiary butyl chloride, or tertiary butyl alcohol. A tertiary alkylation agent within the range from about 10 to about 100 mole percent based on the m-xylene is introduced by line 23. If the catalyst is not introduced from zone 17 into zone 22, in these instances the catalyst may be introduced by line 24 controlled by valve 25 and hydrogen chloride may be introduced by line 26 controlled by valve 27. In most circumstances, however, additional catalysts will not be introduced into zone 22. Alkylation conditions obtaining in zone 22 include a temperature within the range mentioned, pressure sufficient to maintain liquid phase and a residence time within the range from about 10 to about 200 minutes. The alkylated product is withdrawn from zone 22 by line 28 into a separation zone 29 where a separation is made between the aromatic hydrocarbon and the sludged catalyst. It may be desirable in zone 29 to release pressure by opening valve 30 in line 31. The m-xylene is separated from the sludge which is discharged by opening valve 32 in line 33. The spent sludge removed by line 32 may be treated for disposal thereof. As a by-product of such treatment, such as by hydrolysis, 1,3-dimethyl-5-ethylbenzene may be recovered therefrom. This material has the same structural configuration as the primary product. It in itself is a valuable product.

The t-butyl-m-xylene containing product is withdrawn by line 34 into a water washing and neutralization zone 35 provided with line 36 for introducing water and line 37 for introducing neutralization agent which may be ammonia or a sodium hydroxide solution having a Baumé gravity from about 3.0° to about 30.0°. The water washing and neutralization agents may be separated by lines 38 and 39 and the washed and neutralized product is withdrawn by line 40 into a distillation zone 41 which may be an efficient fractional distillation zone provided with suitable internal vapor-liquid contacting means to make a separation of the t-butyl-m-xylene, unreacted m-xylene, and other material. To this end, zone 41 is provided with a heating means such as a steam coil 42, line 43 for removal of m-xylene and lighter material, line 44 for withdrawal of the desired t-butyl-m-xylene and line 45 for discharge of heavier fractions. Thus, it will be seen in accordance with the preferred mode that instead of using a highly efficient fractional distillation zone, such as termed in the art "superfractionation," it is possible to dispense with such efficient and expensive distillation and to employ a transethylation zone. Where $C_8$ m-xylene rich concentrate is available, distillation zone 12 may be dispensed with and the feed introduced directly into zone 17 as has been described.

The present invention is quite important and useful in that it allows the production of purified t-butyl-m-xylene from m-xylene fractions which contain substantial amounts of ethylbenzene. Heretofore, this was not possible. Not only does this allow the production of t-butyl-m-xylene in a highly efficient operation, but it also provides for use of the same catalyst in the transethylation reaction as in the alkylation reaction.

The nature and objects of the present invention having been completely described and illustrated and the best mode contemplated set forth, what I wish to claim as new and useful and secure by Letters Patent is:

1. A method for producing t-butyl-m-xylene from a m-xylene concentrate containing o-xylene and ethylbenzene, said o-xylene and ethylbenzene each being present in an amount within the range from about 0.5 to about 10 mole percent, which comprises the steps of:
    subjecting said m-xylene concentrate to transethylation conditions in the presence of a catalyst to form a product containing said m-xylene, transethylated material formed from said o-xylene and ethylbenzene, and substantially free of ethylbenzene;
    subjecting the total of said product to alkylation conditions in the presence of a catalyst and a tertiary alkylation agent selected from the group consisting of isobutylene, diisobutylene, triisobutylene, t-butyl chloride, and t-butyl alcohol to form an alkylated product containing t-butyl-m-xylene, and
    recovering said t-butyl-m-xylene from said alkylated product;
    said transethylation and alkylation conditions each including a temperature within the range from about 20° to about 100° C. and a pressure sufficient to maintain a liquid phase.

2. A method in accordance with claim 1 in which the catalyst employed in the transethylation and alkylation steps is aluminum chloride and hydrogen chloride.

3. A method in accordance with claim 1 in which the catalyst from the transethylation step is employed in the alkylation step.

4. A method in accordance with claim 1 in which aluminum chloride and hydrogen chloride are employed as the catalyst in the transethylation step in amounts sufficient to form a complex at least with said transethylated material.

5. A method in accordance with claim 1 in which the $C_8$ aromatic hydrocarbon fraction contains from about 0.5 to about 10 mole percent of ethylbenzene.

6. A method in accordance with claim 5 in which the $C_8$ aromatic hydrocarbon fraction contains from about 0.5 to about 5 mole percent of ethylbenzene.

7. A method in accordance with claim 2 in which the catalyst forms a sludge which is discarded and treated to recover 1,3-dimethyl-5-ethylbenzene therefrom.

References Cited
UNITED STATES PATENTS

| | | | |
|---|---|---|---|
| 2,753,386 | 7/1956 | McCaulay et al. | 260—672 X |
| 2,768,985 | 10/1956 | Schlatter | 260—671 |
| 2,803,682 | 8/1957 | McCaulay et al. | 260—671 |
| 2,803,686 | 8/1957 | Stein | 260—672 X |
| 3,121,123 | 2/1964 | Sharman | 260—672 X |

DELBERT E. GANTZ, *Primary Examiner.*

C. R. DAVIS, *Assistant Examiner.*